United States Patent Office 2,798,076
Patented July 2, 1957

2,798,076
1-ISONICOTINYL-2-HYDROXYALKYL-HYDRAZINES

Wilhelm Wenner, Upper Montclair, N. J., assignor to Hoffmann-La Roche Inc., Nutley, N. J., a corporation of New Jersey No Drawing. Original application March 14, 1952, Serial No. 276,705. Divided and this application April 6, 1956, Serial No. 576,528

2 Claims. (Cl. 260—295)

This application relates to novel compounds which are useful to combat tuberculosis. The invention embraces the compounds in the free base form as well as acid addition salts thereof. The compounds are:

1-isonicotinyl-2-(4-hydroxy-1-methyl-butylidene)hydrazine 1-isonicotinyl-2-($\beta,\beta'$-dihydroxy-isopropylidene)hydrazine The following examples will serve to illustrate the invention:

Example 1

28 grams of isonicotinylhydrazine (which is also known as isonicotinic acid hydrazide) and 22 grams of $\gamma$-acetopropanol were dissolved in 100 cc. of hot alcohol. After standing for about 16 hours the solution was distilled to dryness. The viscous residue was recrystallized from benzene, yielding 1-isonicotinyl-2-(4-hydroxy-1-methyl-butylidene)hydrazine, M. P. 121° C.

Example 2

A solution of 20 grams of isonicotinylhydrazine and 100 cc. of hot water was added to a solution of 9 grams of dihydroxy-acetone in 30 cc. of water. After a few minutes crystals began to form. The crystals were filtered after standing for several hours and washed with ice-cold water. The 1-isonicotinyl-2-($\beta,\beta'$-dihydroxy-isopropylidene)hydrazine thus obtained melted at 153° C.

Where the aforesaid compounds are obtained in the form of the free bases, the latter can be readily converted to the acid addition salts on treatment with acids, for example, hydrochloric acid, hydrobromic acid, nitric acid, sulfuric acid, phosphoric acid, ethane sulfonic acid, tartaric acid, and the like. Where the compounds are isolated in the form of acid addition salts, the latter can be converted to the free bases by treatment with an alkali, for example, sodium hydroxide or ammonium hydroxide. It is to be understood that the claims are to be construed as also embracing salts of the bases.

This application is a division of my copending application Serial No. 276,705, filed March 14, 1952, which issued on December 11, 1956 as Patent No. 2,773,877.

I claim:

1. 1-isonicotinyl-2-(4-hydroxy-1-methyl-butylidene)hydrazine.

2. 1-isonicotinyl-2-($\beta,\beta'$-dihydroxy-isopropylidene)hydrazine.

References Cited in the file of this patent

UNITED STATES PATENTS 2,703,322    Fox  ---------------------  Mar. 1, 1955

FOREIGN PATENTS 517,658    Belgium  ----------------  Aug. 13, 1953